United States Patent
Park et al.

(10) Patent No.: US 10,133,357 B2
(45) Date of Patent: Nov. 20, 2018

(54) APPARATUS FOR GESTURE RECOGNITION, VEHICLE INCLUDING THE SAME, AND METHOD FOR GESTURE RECOGNITION

(71) Applicant: HYUNDAI MOTOR COMPANY, Seoul (KR)

(72) Inventors: Hyungsoon Park, Seoul (KR); HyunChul Sim, Suwon-si (KR); Unkyu Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 458 days.

(21) Appl. No.: 14/825,153

(22) Filed: Aug. 12, 2015

(65) Prior Publication Data

US 2016/0162037 A1 Jun. 9, 2016

(30) Foreign Application Priority Data

Dec. 8, 2014 (KR) ........................ 10-2014-0174878

(51) Int. Cl.
| | |
|---|---|
| *G06F 3/01* | (2006.01) |
| *B60K 35/00* | (2006.01) |
| *G06F 3/0354* | (2013.01) |
| *B60K 31/00* | (2006.01) |
| *B60K 37/06* | (2006.01) |

(52) U.S. Cl.
CPC .............. *G06F 3/017* (2013.01); *B60K 31/00* (2013.01); *B60K 35/00* (2013.01); *B60K 37/06* (2013.01); *G06F 3/03547* (2013.01); *B60K 2350/1024* (2013.01); *B60K 2350/1052* (2013.01)

(58) Field of Classification Search
CPC ...... G06F 3/017; G06F 3/03547; B60K 35/00
See application file for complete search history.

(56) References Cited

U.S. PATENT DOCUMENTS

| | | | |
|---|---|---|---|
| 2011/0018832 A1 | 1/2011 | Pryor | |
| 2012/0023440 A1* | 1/2012 | Mueller | ............... B60K 37/06 715/784 |
| 2012/0032916 A1* | 2/2012 | Enoki | .................... G06F 3/044 345/174 |
| 2015/0042580 A1* | 2/2015 | Shim | ..................... G06F 3/017 345/173 |

(Continued)

FOREIGN PATENT DOCUMENTS

| | | |
|---|---|---|
| JP | 2006-103364 A | 4/2006 |
| JP | 2007-008246 A | 1/2007 |

(Continued)

OTHER PUBLICATIONS

Notice of Patent Allowance issued in corresponding Korean Patent Application No. 10-2014-0174878, dated Apr. 28, 2016; with partial English translation.

*Primary Examiner* — Carolyn R Edwards
(74) *Attorney, Agent, or Firm* — McDermott Will & Emery LLP

(57) ABSTRACT

A gesture recognition apparatus may execute a command by recognizing a user's gesture. The gesture recognition apparatus includes a gesture sensor that detects a position and movement of an object in space, and a cover that includes a contact surface which is positioned away from the gesture sensor by a predetermined distance and is brought into contact with the object.

13 Claims, 16 Drawing Sheets

(56) References Cited

U.S. PATENT DOCUMENTS

2015/0091813 A1\* 4/2015 Agostini ............... G06F 3/0412
                                                      345/173
2015/0363027 A1\* 12/2015 Hu ......................... G06F 1/163
                                                      345/174

FOREIGN PATENT DOCUMENTS

| JP | 2009-294720 A | 12/2009 |
|----|---|---|
| JP | 2013-025666 A | 2/2013 |
| KR | 10-2009-0084767 A | 8/2009 |
| KR | 10-2011-0018780 A | 2/2011 |
| KR | 20110018780 A \* | 2/2011 |
| KR | 10-1091515 B1 | 12/2011 |
| KR | 10-2012-0057444 A | 6/2012 |
| KR | 10-2014-0058309 A | 5/2014 |

\* cited by examiner

APPARATUS FOR GESTURE RECOGNITION, VEHICLE INCLUDING THE SAME, AND METHOD FOR GESTURE RECOGNITION

CROSS-REFERENCE TO RELATED APPLICATION

This application claims the benefit of Korean Patent Application No. 10-2014-0174878, filed on Dec. 8, 2014 in the Korean Intellectual Property Office, the disclosure of which is incorporated herein by reference.

BACKGROUND

1. Field

The present disclosure relates to a gesture recognition apparatus, a vehicle including the same, and a gesture recognition method, and more particularly, to a gesture recognition apparatus that may execute a command by recognizing a user's gesture, a vehicle including the same, and a gesture recognition method.

2. Description of the Related Art

A vehicle may include additional functions for a user's convenience such as an audio function, a video function, a navigation function, air conditioning control, seat control, lighting control, and the like in addition to a basic driving function.

In order to perform these functions, a terminal that receives selection of a desired menu from a user according to a hard key method, a touch screen method, or a gesture recognition method or receives an operation command for the selected menu, and displays a menu screen or a control screen is provided in the vehicle.

When using the hard key method as a method for inputting a command to the terminal, there are several problems that a large physical space for having a large number of hard keys is required in order to execute various commands, a user's operational load is increased in order to receive an operation command if using a small number of hard keys, and a button illumination light-emitting diode (LED) for identifying physical buttons at night and other button mechanisms are required to cause an increase in manufacturing costs of the terminal.

Meanwhile, when using the touch screen method as a method for inputting a command to the terminal, a driver has to touch a touch screen while watching the touch screen in order to input an operation command, which may affect safety driving. In addition, it is inconvenient to a user to touch the touch screen while being seated.

Thus, the need for a terminal that can recognize a gesture is emerging. A gesture recognition method may use a specific hand shape or an operation such as pause for a predetermined time, but in this instance, there may be a risk of misrecognition of a corresponding operation command when the hand's operation is unnatural or unintended. In addition, it is difficult to distinguish the beginning and the end of the corresponding gesture among continuous natural operation, and therefore there are difficulties in accurately recognizing a user's intended gesture.

PRIOR ART DOCUMENT

In Patent Application Publication No. 10-2012-0057444 (published on Jun. 5, 2012 with the Korean Intellectual Property Office), a gesture user interface for a vehicle is disclosed.

SUMMARY

Therefore, it is an aspect of the present invention to provide a gesture recognition apparatus that may increase recognition accuracy of a gesture and provide, to a user, immediate feedback for whether the gesturer is input as intended by the user, a vehicle including the same, and a gesture recognition method.

It is another aspect of the present invention to provide a gesture recognition method that may provide a broader execution command by separating an input method of a gesture into a space gesture and a contact gesture, a vehicle including the same, and a gesture recognition method.

Additional aspects of the invention will be set forth in part in the description which follows, and in part, will be obvious from the description, or may be learned by practice of the invention.

In accordance with one aspect of the present invention, a gesture recognition apparatus includes: a gesture sensor that detects a position and movement of an object in space; a cover that includes a contact surface which is positioned away from the gesture sensor by a predetermined distance; and a storage containing position information of the contact surface.

Here, the cover may include a semi-spherical shape or a partial shape of a semi-sphere with respect to the gesture sensor.

Also, the contact surface may be provided so that a distance between the gesture sensor and each point on the contact surface becomes constant.

Also, the cover may include a planar contact surface and a curved contact surface that extends outside the planar contact surface.

Also, the cover may include one side provided to be opened so that the object is inserted through the opened side, and a gesture input space provided between the contact surface and the gesture sensor.

Also, the cover may include a tap portion that is formed to be recessed so that a finger's distal portion of a user is seated on the tap portion.

Also, the gesture recognition apparatus may further include a controller that outputs operation signals by analyzing a gesture through signals input from the gesture sensor.

Also, the controller may recognize at least one of a position, a shape, and a movement trajectory of the object in a state in which the object is brought into contact with the contact surface, as a contact gesture.

Also, the controller may recognize at least one of the position, the shape, and the movement trajectory of the object in a state in which the object is separated from the contact surface, as a space gesture.

In accordance with another aspect of the present invention, a gesture recognition apparatus includes: a gesture recognition unit that detects a position and movement of an object in space; a contact unit that is positioned to be spaced apart from the gesture recognition unit and is brought into contact with the object; and a controller that receives signals of the gesture recognition unit to analyze a gesture and output operation signals. The controller recognizes at least one of a position, a shape, and a movement trajectory of the object in a state in which the object is brought into contact with the contact unit, as a contact gesture.

Here, the controller may recognize at least one of the position, the shape, and the movement trajectory of the object in a state in which the object is separated from the contact unit, as a space gesture.

Also, the contact unit may include a tap portion, and the controller may receive an operation in which the object is brought into contact with the tap portion, as a tap gesture.

Also, the contact unit may include a scroll portion, and the controller may receive a trajectory in which the object moves while being in contact with the scroll portion, as a scroll gesture.

Also, the gesture recognition apparatus may further include a space input unit that is provided in a lower portion of the contact unit to form a space in which the object is inserted. The controller may recognize at least one of the position, the shape, and the movement trajectory of the object in an upper portion of the contact unit as a first space gesture, recognize at least one of the position, the shape, and the movement trajectory of the object in the space input unit as a second space gesture, and output mutually different operation signals by distinguishing the first space gesture and the second space gesture.

Also, the controller may start contact gesture recognition when the object is recognized to be positioned on a contact surface of the contact unit stored in advance.

Also, the controller may recognize, as a tap gesture, a case in which the object is recognized to be positioned on a contact surface of the tap portion stored in advance, and start contact gesture recognition when the object is recognized to be positioned on a contact surface of the contact unit excluding the tap portion stored in advance.

Also, the controller may terminate the contact gesture recognition when the object is recognized to be separated from the contact surface of the contact unit stored in advance.

Also, the controller may recognize, as a continuous contact gesture, a case in which the object is recognized to be separated from the contact surface of the contact unit stored in advance and then recognized again to be positioned on the contact surface of the contact unit stored in advance within a predetermined time.

Also, the controller may start second space gesture recognition when the object is recognized to be positioned lower than the contact surface of the contact unit stored in advance.

In accordance with still another aspect of the present invention, a vehicle includes: a mounting surface that is provided inside the vehicle; a gesture recognition unit that is provided on the mounting surface to detect a position and movement of an object in space inside the vehicle; a contact unit that is positioned to be spaced apart from the gesture recognition unit and is brought into contact with the object; and a controller that receives signals of the gesture recognition unit to analyze a gesture and output operation signals. The controller recognizes at least one of a position, a shape, and a movement trajectory of the object in a state in which the object is brought into contact with the contact unit, as a contact gesture.

Here, the mounting surface may be provided in at least one of a gearbox and a center fascia.

Also, the gesture recognition unit may be provided on a groove recessed from the mounting surface, and the contact unit may be provided in the same position as that of an extension surface of the mounting surface.

In accordance with yet another aspect of the present invention, a gesture recognition method includes: recognizing a position of an object moving in space based on signals detected by a gesture sensor; determining whether the recognized position of the object is matched to any one among positional information of a contact surface stored in advance; and recognizing, as a contact gesture, a case in which the matched positional information is determined to be present.

Here, the gesture recognition method may further include determining whether the recognized position of the object is matched to positional information of a function unit designated as a specific region of the contact surface, and recognizing, as a function gesture, a case in which the matched positional information is determined to be present.

Also, the gesture recognition method may further include recognizing, as a space gesture, a case in which the matched positional information is determined to be absent.

Also, when the matched positional information is determined to be absent, the gesture recognition method may further include recognizing, as a first space gesture, a case in which the recognized position of the object is determined to be outside the contact surface; and recognizing, as a second space gesture, a case in which the recognized position of the object is determined to be inside the contact surface.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
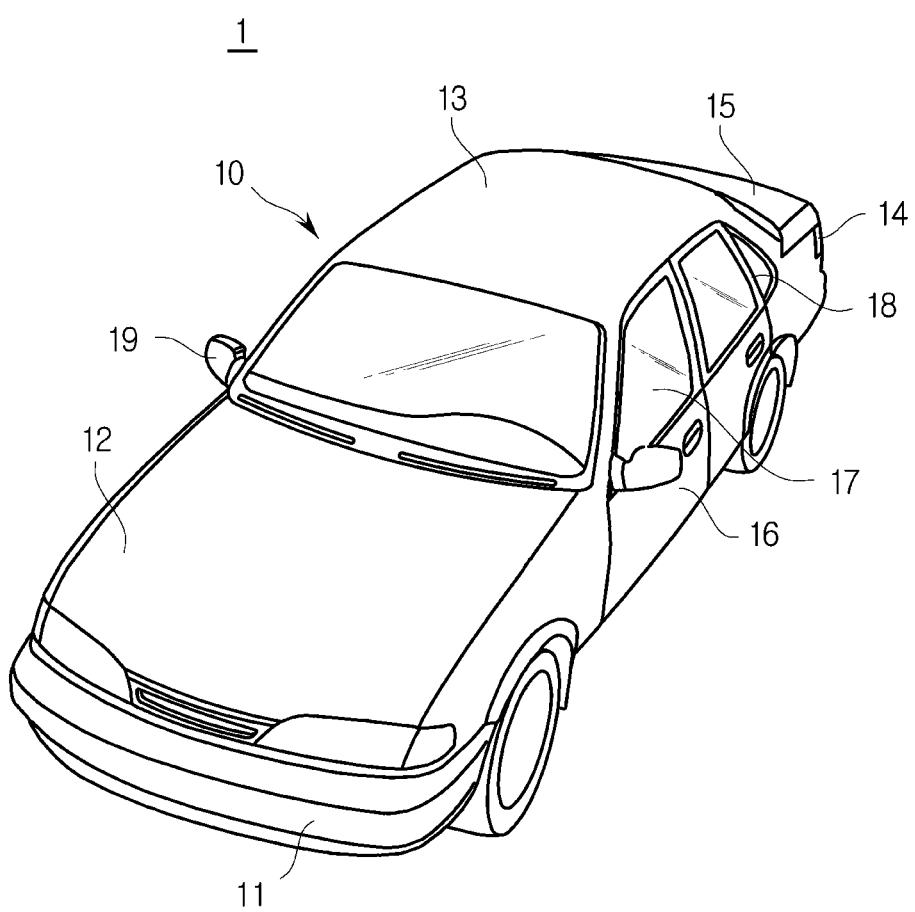
FIG. 1 is a diagram illustrating an exterior of a vehicle according to an embodiment of the present invention.

Reference will now be made in detail to the embodiments of the present invention, examples of which are illustrated in the accompanying drawings, wherein like reference numerals refer to like elements throughout.

Example embodiments of the present invention are disclosed herein. However, specific structural and functional details disclosed herein are merely representative for purposes of describing example embodiments of the present invention, and example embodiments of the present invention may be embodied in many alternative forms and should not be construed as limited to example embodiments of the present invention set forth herein.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A gesture recognition apparatus according to an embodiment of the present invention may be installed in a vehicle 1 to be operated. In addition, the gesture recognition apparatus may be connected to a variety of electronic apparatuses such as multimedia devices, medical devices, computers, and the like to be operated.

Here, the vehicle 1 may refer to a variety of devices for moving a human or an object such as an object, an animal, or the like from a point of departure to a point of destination. The vehicle 1 may include vehicles driving along a road or rail, ships, airplanes, and the like.

In addition, the vehicle 1 driving along the road or rail may be moved in a predetermined direction according to the rotation of at least one of wheels, and include, for example, three-wheeled or four-wheeled automobiles, construction machines, motorcycles, a motor device, bicycles, and trains driving along the rail.

Figure 2:
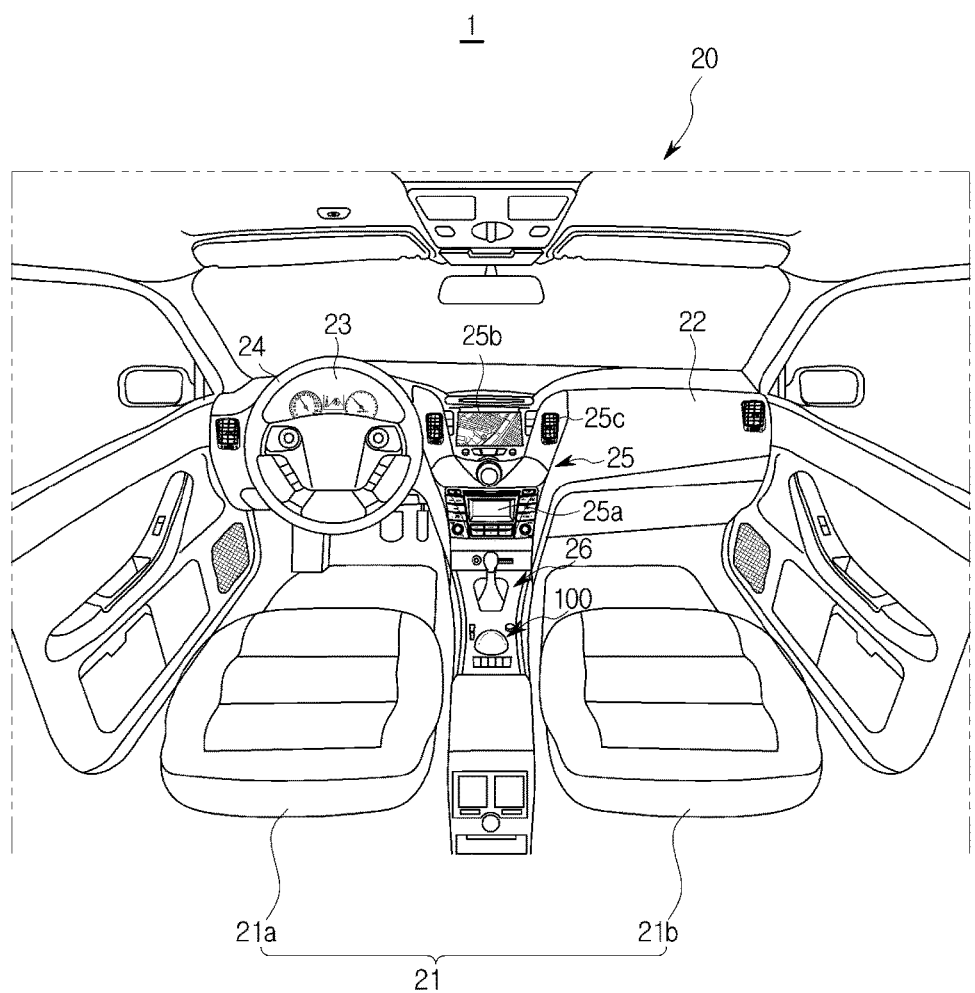
FIG. 2 is a diagram illustrating an interior of a vehicle in which a gesture recognition apparatus according to a first embodiment of the present invention is provided.

The vehicle 1 according to an embodiment of the present invention will be described with reference to FIGS. 1 and 2. FIG. 1 illustrates an exterior 10 of the vehicle 1 according to an embodiment of the present invention, and FIG. 2 illustrates an interior 20 of the vehicle 1 in which a gesture recognition apparatus 100 according to a first embodiment of the present invention is provided.

The vehicle 1 includes a body having the exterior 10 and the interior 20, and a chassis which is the remaining part excluding the body and in which a mechanical device required for driving is installed.

As shown in FIG. 1, the exterior 10 of the body includes a front panel 11, a bonnet 12, a roof panel 13, a rear panel 14, a trunk 15, front, rear, right, and left doors 16, window glass 17 provided in the front, rear, right, and left doors, and the like.

The exterior 10 of the body may further include a filler 18 respectively provided at the boundaries among the front panel 11, the bonnet 12, the roof panel 13, the rear panel 14, the trunk 15, and the front, rear, right, and left window glass 17.

The exterior 10 of the body may further include side mirrors 19 that provide a field of view behind the vehicle 1 to a driver, and the like.

The chassis of the vehicle 1 may further include a power generating device, a power transmitting device, a traveling device, a steering device, a brake device, a suspension device, a transmission device, a fuel device, front, rear, right, and left wheels, and the like.

Meanwhile, the vehicle 1 may further include a number of safety devices for the safety of drivers and passengers. The safety device of the vehicle 1 may include several types of safety devices such as an air bag control device for securing the safety of the drivers and passengers at the time of vehicle collision, an electronic stability control (ESC) device for stabilizing an attitude of the vehicle at the time of acceleration or cornering of the vehicle, and the like.

In addition, the vehicle 1 may further and selectively include detectors such as a proximity sensor for detecting obstacles or other vehicles on the rear or side of the vehicle 1, a rain sensor for detecting whether precipitation occurs and an amount of precipitation, a temperature sensor for detecting indoor/outdoor temperature, a wheel speed sensor for detecting the speed of front, rear, right, and left wheels, an acceleration sensor for detecting acceleration, a yaw rate sensor for detecting a yaw rate, a gyro sensor for detecting an attitude of the vehicle, and the like.

Such a vehicle 1 includes an electronic controller (ECU) that controls driving of the power generating device, the power transmitting device, the traveling device, the steering device, the brake device, the suspension device, the transmission device, the fuel device, the various safety devices, and the various sensors.

In addition, the vehicle 1 may selectively include an air conditioning device, a lighting device, a navigation device, a heater of seats (that is, hot wire), a hands-free device, a GPS, an audio device, a Bluetooth device, a rear camera, a charging device for an external terminal, and an electronic device such as a high-pass device which are provided for a driver's convenience.

In addition, the vehicle 1 may selectively include electronic devices such as a sunroof opening and closing device for automatically opening and closing a sunroof, a door opening and closing device for automatically opening and closing doors, a window opening and closing device for automatically opening and closing the window glass, and the like.

The vehicle 1 may further include a start button for inputting an operation command to a starting motor (not shown). That is, when the start button is turned on, the vehicle 1 drives the starting motor (not shown), and drives an engine (not shown) that is the power generating device through the operation of the starting motor.

In addition, the vehicle 1 may further include a battery (not shown) that is electrically connected to the navigation device, the audio device, an indoor lighting device, the starting motor, and other electronic devices to supply driving power. Such a battery performs charging using a self-generator or power of the engine during traveling of the vehicle 1.

Referring to FIG. 2, the interior 20 of the body of the vehicle may include seats 21 (21a and 21b) on which passengers sit, a dashboard 22, a gauge board (that is, cluster 23) disposed on the dashboard 22, a steering wheel 24 that manipulates a direction of the vehicle, a center fascia 25 in which a control panel of the audio device and the air conditioning device is provided, and a gearbox 26 provided between a driver's seat 21a and a front passenger's seat 21b.

The seats 21 includes the driver's seat 21a on which a driver sits, the front passenger's seat 21b on which a passenger sits, and rear seats positioned on a rear side of the vehicle. Meanwhile, the arrangement of the rear seats and the number of columns of the rear seats may vary depending on the type of the vehicle.

In the cluster 23, a tachometer, a speedometer, a cooling water thermometer, a fuel gauge, a turn signal indicator, a high beam indicator light, a warning light, a seat belt warning light, an odometer, a traveling recorder, an automatic transmission selector lever indicator, a door open warning light, an engine oil warning light, and/or a fuel shortage warning light may be provided.

In addition, the cluster 23 may be implemented in a digital manner. The cluster that is implemented in the digital manner displays vehicle information and traveling information by images.

The steering wheel 24 is a device for controlling a traveling direction of the vehicle 1, and may include a rim which is gripped by a driver and a spoke that is connected to the steering device of the vehicle 1 to connect the rim and a hub of a rotary shaft for steering. According to an embodiment of the present invention, in the spoke, a variety of devices within the vehicle 1, for example, a control button for controlling the audio device, or the like may be provided.

The center fascia 25 is positioned between the driver's seat 21a and the front passenger's seat 21b in the dashboard 22, and has a control panel in which a plurality of buttons for controlling the audio device 25a, the air conditioning device 25c, and the heater of the seats are arranged. In such a center fascia 25, a ventilator, a cigar jack, and the like may be provided. In addition, in the center fascia 25, a terminal device that receives information from a user and outputs results corresponding to the input information, for example, the navigation device 25b may be provided. Meanwhile, the audio device 25a and the navigation device 25b may be integrally provided as an audio-video-navigation (AVN) device.

The audio device 25a includes a control panel in which a plurality of buttons for performing various functions are provided. The audio device 25a may provide a radio mode for providing a radio function and a media mode for playing audio files of various storage media in which the audio files are stored. The buttons provided on the control panel of the audio device 25a may be divided into buttons for providing a radio mode performing-related function, buttons for providing a media mode performing-related function, and buttons commonly used in both radio and media modes.

The navigation device 25b is a device that receives positional information from satellites through a large number of global positioning systems (hereinafter, referred to as "GPS"), calculates a current position of the vehicle, displays the calculated current position on a map by performing map matching on the calculated position, searches a route from the calculated current position to a destination according to a preset route search algorithm by receiving the destination from a user, displays a corresponding result by matching the searched route on the map, and guides the user to the destination along the route, and may be embedded in the center fascia 25 of the vehicle 1. Alternatively, the navigation device 25b may be provided on the dashboard 22 in a hanger type.

The air conditioning device 25c is a device that maintains the inside of the vehicle 1 comfortable by controlling a temperature, humidity, cleanliness of air, and a flow of air inside the vehicle 1, and may be embedded in the center fascia 25 of the vehicle 1. In addition, the air conditioning device 25c may include at least one ventilator for discharging the conditioned air.

In the gearbox 26, operating devices which are required to be operated while a driver drives the vehicle 1 may be positioned. In general, in the gearbox 26, a shift lever for transmission of the vehicle 1 and an input device for executing various devices of the vehicle 1 or controlling whether a control module or control devices of the vehicle 1 are executed may be provided.

The vehicle 1 may include the gesture recognition apparatus 100 for controlling operations of the various electronic devices based on operation commands input by a user. The gesture recognition apparatus 100 according to an embodiment of the present invention may recognize a user's gesture, determine an operation command corresponding to the recognized gesture, and output the determined operation command to the electronic device.

Figure 3:
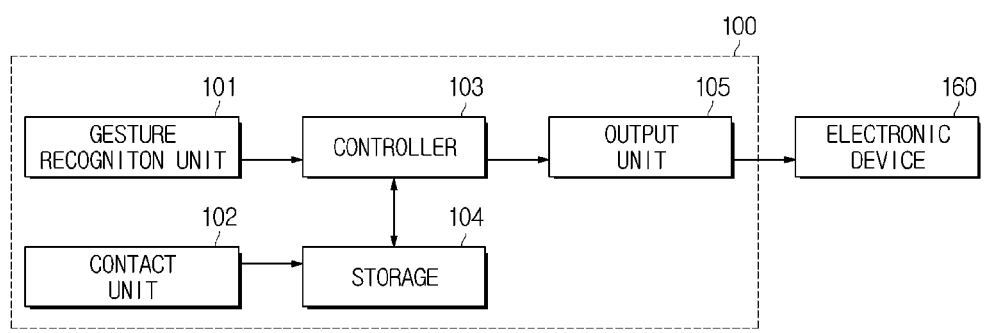
FIG. 3 is a control configuration diagram illustrating a gesture recognition apparatus according to an embodiment of the present invention.

The gesture recognition apparatus 100 will be described with reference to FIG. 3. FIG. 3 is a control configuration diagram illustrating the gesture recognition apparatus 100 according to an embodiment of the present invention.

As shown in FIG. 3, the gesture recognition apparatus 100 may include a gesture recognition unit 101 that can recognize an object, a contact unit 102 that is provided to be brought into contact with the object, a controller 103 that receives signals transmitted from the gesture recognition unit 101, recognizes a gesture based on the received signals, and determines an operation command corresponding to the recognized gesture, a storage 104, and an output unit 105.

Meanwhile, the controller 103 may be disposed together with the storage 104 and the output unit 105 to be implemented as a single module.

The gesture recognition unit 101 recognizes the object, and transmits recognition signals for a position, a shape, and movement information of the recognized object to the controller 103. The object may include a part of a user's body or a tool. The part of the user's body may include hands or fingers, and the tool may include a pen or gloves.

The gesture recognition unit 101 may detect a position of the object in space. As an example, the gesture recognition unit 101 may display a position of one point of the object in space using a three-dimensional (3D) orthogonal coordinate system (xyz coordinate system) when the gesture recognition unit 101 is used as a reference point. Alternatively, the gesture recognition unit 101 may use a spherical or cylindrical coordinate system.

Alternatively, the gesture recognition unit 101 may detect the shape of the object. As an example, when the object is a finger, the gesture recognition unit 101 may detect the overall shape of the finger and a center point of a finger's distal portion in which touch generally occurs.

Alternatively, the gesture recognition unit 101 may detect movement of the object. As an example, the gesture recognition unit 101 may detect a starting point in which the object starts to move, an end point in which the object stops movement, and a movement trajectory along which the object moves between the starting point and the end point.

The gesture recognition unit 101 may use an image sensor or an infrared sensor (IR sensor). However, the image sensor and the infrared sensor are merely an example of a sensor capable of detecting or sensing the object in space, and a sensor using a different mechanism may be used.

The contact unit 102 may be positioned to be spaced apart from the gesture recognition unit 101, and may be brought into contact with the object.

The gesture recognition unit 101 may be positioned so as to detect the position and movement of the object while the object is brought into contact with the contact unit 102. The image sensor or the infrared sensor may detect the object when the object is separated from the sensor by a predetermined distance. Thus, the contact unit 102 should be positioned to be separated from the gesture recognition unit 101 by a reference distance or more in which the object can be detected by the sensor.

The controller 103 recognizes a gesture based on object-related signals collected from the gesture recognition unit 101. The controller 103 may determine whether the object is present in images collected from the sensor, and determine the position, the shape, and a movement direction of the object when the object is determined to be present in the images to thereby recognize a gesture intended by a user.

In addition, the controller 103 may recognize movement information of the object by tracking the position of the object over time. Here, the movement information includes the movement direction and movement distance of the object.

The controller 103 may distinguish a space gesture and a contact gesture.

The space gesture may be a gesture that can be recognized in a state in which the object is not brought into contact with the contact unit 102. The space gesture may be at least one of the position, the shape, and the movement trajectory of the object. As an example, when it is assumed that a user performs a gesture of moving a hand from the left to the right while being separated from the contact unit 102, the controller 103 may become aware that the object is the user's hand by analyzing the shape of the object, aware that the hand is separated from the contact unit 102 by analyzing the position of the hand, and determine a gesture indicated by a corresponding trajectory by analyzing a movement trajectory of the hand.

The contact gesture may be a gesture that can be recognized in a state in which the object is brought into contact with the contact unit 102. The contact gesture may be at least one of the position, the shape, and the movement trajectory of the object. As an example, when it is assumed that the user performs a gesture of drawing a numerical number in a state in which the user's finger is brought into contact with the contact unit 102, the controller 103 may become aware that the object is the user's finger by analyzing the shape of the object, aware that the finger is brought into contact with the contact unit 102 by analyzing the position of the finger, and determine a gesture indicted by the corresponding trajectory by analyzing the movement trajectory of the finger.

The controller 103 may compare positional information of the contact unit 102 and positional information of the object in order to determine whether the object is brought into contact with the contact unit 102. The controller 103 may use the prestored positional information of the contact unit 102. As an example, the gesture recognition unit 101 may display a position of one point of the contact unit 102 in space using a 3D orthogonal coordinate system (xyz coordinate system) when the gesture recognition unit 101 is used as a reference point. Alternatively, the gesture recognition unit 101 may use a spherical or cylindrical coordinate system.

The controller 103 may compare the positional information of the object detected by the gesture recognition unit 101 and the prestored positional information of the contact unit 102, and recognize the contact gesture by determining that the object is brought into contact with the contact unit 102 when the positional information of the object and the positional information of the contact unit 102 are the same.

The storage 104 stores operation commands of a plurality of electronic devices 160, and stores gesture information corresponding to the operation commands for controlling each of the plurality of electronic devices 160. Here, the plurality of electronic devices 160 include the audio device 25a for playing radio or music files, the navigation device 25b for guiding a route to a destination, a plurality of lighting devices for adjusting the brightness of the inside of the vehicle, the air conditioning device 25c for adjusting a temperature of the inside of the vehicle, a lighting device disposed outside the vehicle (headlight, and the like), the Bluetooth device for communication with an external terminal device, the heater for providing heat to the seats, the window glass opening and closing device for automatically opening and closing the window glass, the sunroof opening and closing device for automatically opening and closing the sunroof, the door opening and closing device for automatically opening and closing the front, rear, right, and left doors, and a door locking device (not shown) for locking or releasing the front, rear, right, and left doors.

In addition, the storage 104 may store operation commands of at least two electronic devices corresponding to a single gesture.

In addition, the storage 104 may store the positional information of the contact unit 102. The storage 104 may store information related to a distance by which the contact unit 102 is separated from the gesture recognition unit 101 and the direction of the contact unit 102, and determine whether the object is brought into contact with the contact unit 102 by comparing the prestored information and the positional information of the object.

In addition, the storage 104 may store positional information of a function unit that is a region predefined on the contact unit 102. The function unit may perform one or more of tapping, scrolling, function of a keypad, shortcut, and the like.

The output unit 105 is connected to each of the plurality of electronic devices 160 to output operation commands to at least one electronic device. The output unit 105 may include digital and analog ports to which the plurality of electronic devices 160 are connected, and the like.

In addition, the output unit 105 may include CAN communication for communication with the plurality of electronic devices.

Figure 4:
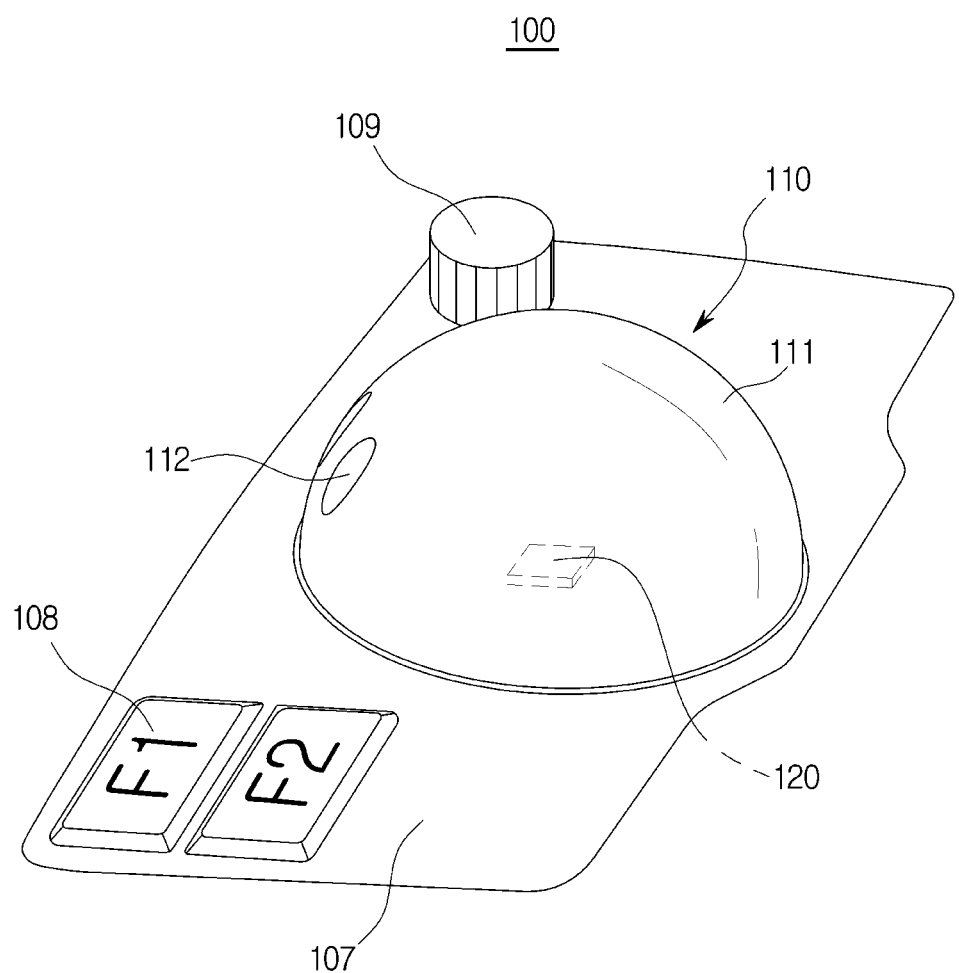
FIG. 4 is a perspective diagram illustrating a gesture recognition apparatus according to a first embodiment of the present invention.
Figure 5:
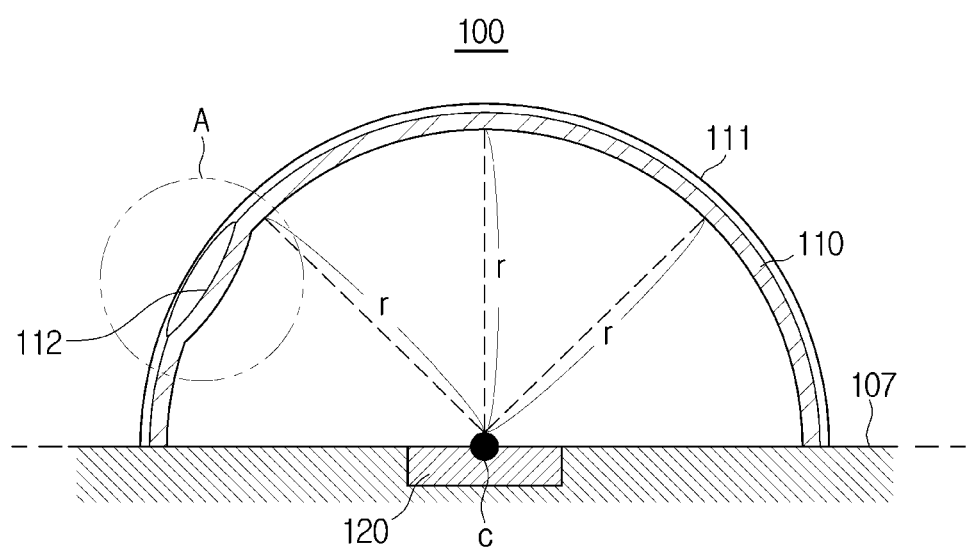
FIG. 5 is a cross-sectional diagram illustrating a structure of a gesture recognition apparatus according to a first embodiment of the present invention.

Hereinafter, the gesture recognition apparatus 100 according to a first embodiment of the present invention will be described in detail with reference to FIGS. 4 and 5. FIG. 4 is a perspective diagram illustrating the gesture recognition apparatus 100 according to a first embodiment of the present invention, and FIG. 5 is a cross-sectional diagram illustrating a structure of the gesture recognition apparatus 100 according to a first embodiment of the present invention.

The gesture recognition apparatus 100 may include a gesture sensor 120 that detects a position and movement of an object in space, and a cover 110 that is brought into contact with the object.

Reference numerals which are not described are a mounting surface 107 on which the cover 110 is provided, a hard key 108 that performs a predetermined function, and a knob 109 that adjusts a volume of the audio device, and the like.

The gesture sensor 120 may detect the position and movement of the object in space as well as the position of the object on a plane. That is, it is possible to be aware of distance information from the gesture sensor 120 to the object and direction information of the object. In addition, it is possible to detect the shape of the object.

The gesture sensor 120 may use any one of the image sensor and the infrared sensor (IR sensor).

The cover 110 may be made of a material that does not obstruct recognition of the object by the gesture sensor 120. As an example, when the image sensor is used as the gesture sensor 120, a transparent cover 110 may be used. As an example, the cover may use optical plastic.

The cover 110 may be positioned to be separated from the gesture sensor 120 by a predetermined distance. In order for the gesture sensor 120 to recognize the object, the object has to be positioned to be separated from the gesture sensor 120 by a predetermined distance. Thus, the cover 110 may be positioned to be separated from the gesture sensor 120 by a minimum distance or more in which the gesture sensor 120 can recognize the object.

The cover 110 includes a contact surface 111 that can be brought into contact with the object. As an example, the cover 110 may have a predetermined thickness, and the contact surface 111 may be an outer surface of the cover 110.

The cover 110 may include a semi-spherical shape or a partial shape of a semi-sphere with respect to the gesture sensor 120. In this instance, a center portion of the gesture sensor 120 may be used as the center of the sphere. When the cover 110 has the semi-spherical shape with respect to the gesture sensor 120, a distance (see, r of FIG. 5) from the gesture sensor 120 to the contact surface 111 of the cover 110 may be constant.

The user may input the contact gesture while gripping the cover 110 with his or her hand. Thus, when the cover 110 includes a convex curved surface, it is possible to improve the sense of grip using the user's hand (or grip feeling). As an example, the cover 110 may have a shape similar to a shape of a mouse.

As examples of the contact gesture that can be input by the user while gripping the cover 110 with his or her hand, tipping the contact surface 111 using fingers, rubbing the contact surface 111, drawing a curved line or a circle on the contact surface 111, and the like may be given. Alternatively, the user may tip or rub the contact surface 111 using the whole hand while gripping the cover 110 with his or her hand. The controller 103 may recognize each contact gesture to output the operation commands.

The cover 110 may include a tap portion 112 in which a tap gesture can be input. The tap gesture means a gesture of tipping the contact unit 102 using a finger.

The controller 103 or the storage 104 may store a predetermined region of the cover 110 as the tap portion 112 in advance. As an example, the tap portion 112 may be designated in a position that can be easily tapped using the index finger or the middle finger of the user. When the object is brought into contact with the tap portion 112, the controller 103 may recognize that the contact gesture is input, thereby outputting the corresponding operation command. That is, the user tapping the tap portion 112 may be seen as an action similar to clicking a button of the mouse.

A plurality of tap portions 112 may be provided, and the respective tap portions 112 may be interpreted as mutually different operation commands. As an example, the tap portion may be positioned on the front side, and two tap portions may be arranged to be separated from each other. That is, the two tap portions 112 may be provided in the position which can be easily tapped using the index finger or the middle finger of the user.

The controller 103 may recognize an operation of the user moving fingers in the tap portion 112 as a pointing gesture. That is, a cursor on a display unit may be moved in a direction in which the user's finger moves while seating the user's finger on the tap portion 112. This may be similar to the operation of a pointing stick of IBM.

Figure 6:
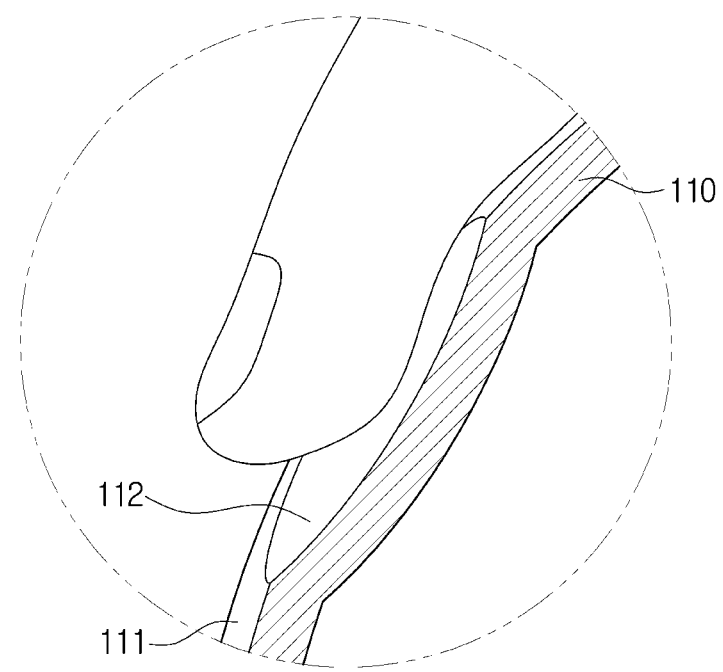
FIG. 6 is an enlarged diagram of a region A of FIG. 5 illustrating a state in which a finger is seated on a tap portion.

FIG. 6 is an enlarged diagram of a region A of FIG. 5 illustrating a state in which a finger is seated on a tap portion.

Referring to FIG. 6, the tap portion 112 may have a concave shape. As an example, the tap portion 112 may have a shape recessed from the cover 110 so that the finger's distal portion of the user can be seated on the tap portion 112. Thus, the user may be easily aware of whether the finger is positioned on the tap portion 112 without visually checking the tap portion 112. In addition, when the tap portion 112 is provided to have a shape similar to a curved line of the finger's distal portion, it is possible to improve the operation feeling.

In FIG. 4, two tap portions are provided on the front side, and both the tap portions have the concave shape. That is, on the tap portions 112, the distal portion of the user's index finger and the distal portion of the user's middle finger may be respectively seated.

The controller 103 may recognize the space gesture. That is, the controller 103 may recognize the shape or movement of the object in space as a gesture.

The controller 103 may recognize the shape of the object as a gesture. As an example, in a case of the user's hand having a different shape such as spreading some fingers, the controller 103 may recognize the hand having the different shape as a different gesture.

The controller 103 may recognize the movement of the object as the space gesture. As an example, when the user changes the movement of the hand such as moving his or her hand from the left to the right or in the opposite direction, gripping his or her hand in a state of spreading his or her hand, waving his or her hand in a state of spreading his or her hand, and the like, the controller 103 may recognize changes in the movement of hand as mutually different gestures.

Meanwhile, the gesture sensor 120 may recognize the movement of the object even when the user inputs more precise gesture than the above-described gestures, and the controller 103 may recognize this as the space gesture. As an example, when the user draws a predetermined route or trajectory using his or her finger, the controller 103 may recognize this as the space gesture.

However, there are two problems when the user inputs the predetermined gesture and the controller 103 recognizes a gesture intended by the user.

First, it is difficult to determine the start and end of the corresponding gesture. A time when the user starts to draw the corresponding gesture may be changed depending on the user's will. Thus, in order for the controller 103 to recognize a starting point of the corresponding gesture, the user should inform that an input of the corresponding gesture starts through a separate operation. Similarly, in order for the controller 103 to recognize an end point of the corresponding gesture, the user should inform that the input of the corresponding gesture is terminated through a separate operation.

Second, the shape of the gesture intended by the user may be different from the shape of the gesture recognized by the gesture sensor 120.

First, a case in which a user inputs a gesture (planar gesture) having a two-dimensional shape in space will be described. Even if the user intends to input a planar gesture on a virtual plane using his or her finger, a 3D-shaped gesture is actually drawn. That is, a height of the finger is highly likely to be changed while the user draws the corresponding gesture. Thus, there arises a difference between the shape of the gesture intended by the user and the shape of the gesture recognized by the gesture sensor 120.

Such a difference may adversely affect the accuracy of recognition of the gesture. As a gesture having more precise shape is input by the user, there is more risk of misrecognition due to the above-described distortion.

Next, a case in which gestures are connected by at least two strokes will be described. When gestures are connected by a single stroke, no significant problem occurs. However, when the gestures are connected by at least two strokes, demarcation between the gesture and connection operations becomes obscure.

When a gesture having two strokes is drawn on a plane using a user's finger, the user brings the finger into contact with the plane, draws the first stroke, and then removes the finger from the plane. Next, the user brings the finger into contact with the plane again in a position outside the position of removing the finger from the plane, draws the second stroke, and then removes the finger from the plane.

Aside from a problem about how the controller 103 recognizes the start and end of the gesture, a connection operation connecting the strokes is not a part of the gesture which is intended by the user, but the controller 103 may also recognize the connection operation as a part of the gesture. Thus, there is a significant difference between the shape of the gesture intended by the user and the shape of the gesture recognized by the controller 103.

Figure 7A:
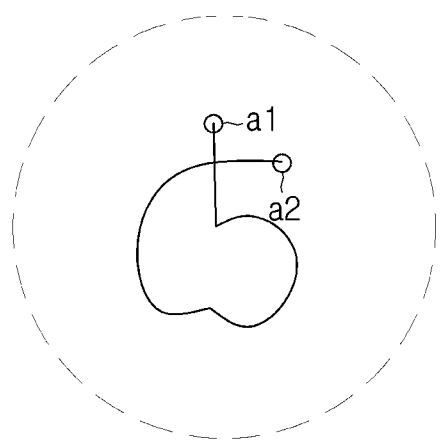
FIG. 7A is a diagram illustrating a finger's trajectory when inputting "5" in space.
Figure 7B:
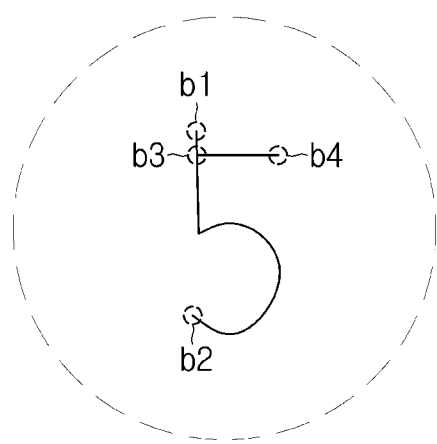
FIG. 7B is a diagram illustrating a finger's trajectory when inputting "5" on a contact surface.

A case in which a gesture is distorted to be input to the gesture sensor 120 when the gesture is drawn in space using a user's finger will be described with reference to FIGS. 7A and 7B. FIG. 7A is a diagram illustrating a finger's trajectory when inputting "5" in space, and FIG. 7B is a diagram illustrating a finger's trajectory when inputting "5" on the contact surface 111.

Referring to FIG. 7A, when it is assumed that a user draws a numerical number "5" in space using his or her finger, it can be seen that there is a difference between a trajectory of the finger recognized by the gesture sensor 120 and the numerical number "5".

When the user draws the numerical number "5", the numerical number "5" is drawn by two strokes, not by one stroke, but the gesture sensor 120 may recognize even a trajectory of the finger moving between the two strokes as a gesture. That is, the controller 103 may recognize a case in which the finger is positioned at a point a1 as a start of the corresponding gesture, recognize a case in which the finger is positioned at a point a2 as an end of the corresponding gesture, and recognize a trajectory of the finger moving between the points a1 and a2 as a gesture.

Thus, there arises a difference between the shape of the gesture recognized by the controller 103 and the numerical number "5" that is the gesture intended by the user.

A case in which a user draws the numerical number "5" using his or her finger on the contact surface 111 will be described with reference to FIG. 7B. The controller 103 may recognize a case in which the finger is positioned at a point b1 as a start of the corresponding gesture, and recognize a case in which the finger is positioned at a point b2 as an end of one stroke. Next, the controller 103 may recognize a case in which the finger is positioned at a point b3 as a start of the other stroke, and recognize a case in which the finger is positioned at a point b4 as an end of the corresponding gesture. That is, the controller 103 may recognize only a trajectory in which the finger moves in a state in which the finger is brought into contact with the contact surface 111, as a gesture, and therefore the trajectory in which the finger moves between the points b2 and b3 may not be recognized as a gesture. Thus, the shape of the gesture intended by the user and the shape of the gesture recognized by the controller 103 coincide with each other, and therefore it is possible to improve a gesture recognition rate.

Figure 8:
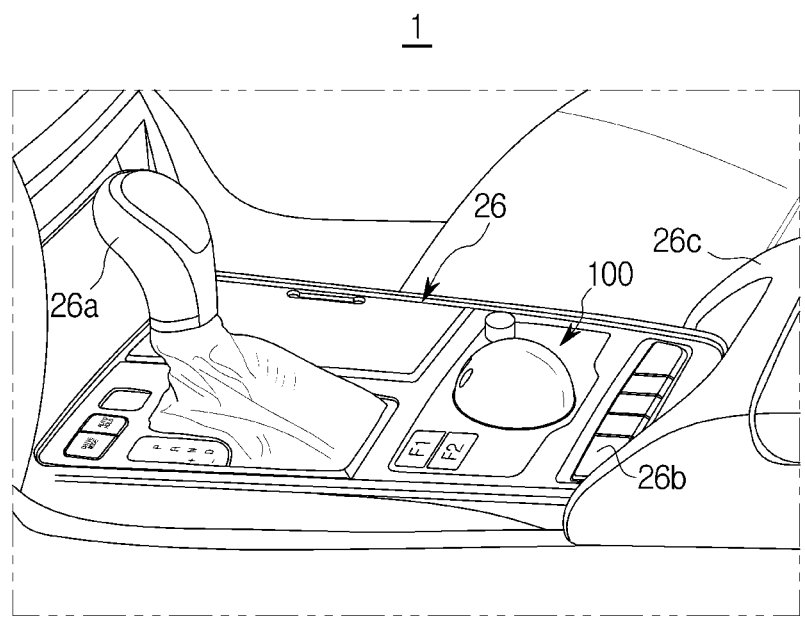
FIG. 8 is a perspective diagram illustrating a state in which a gesture recognition apparatus according to a first embodiment of the present invention is installed in a gearbox.
Figure 9:
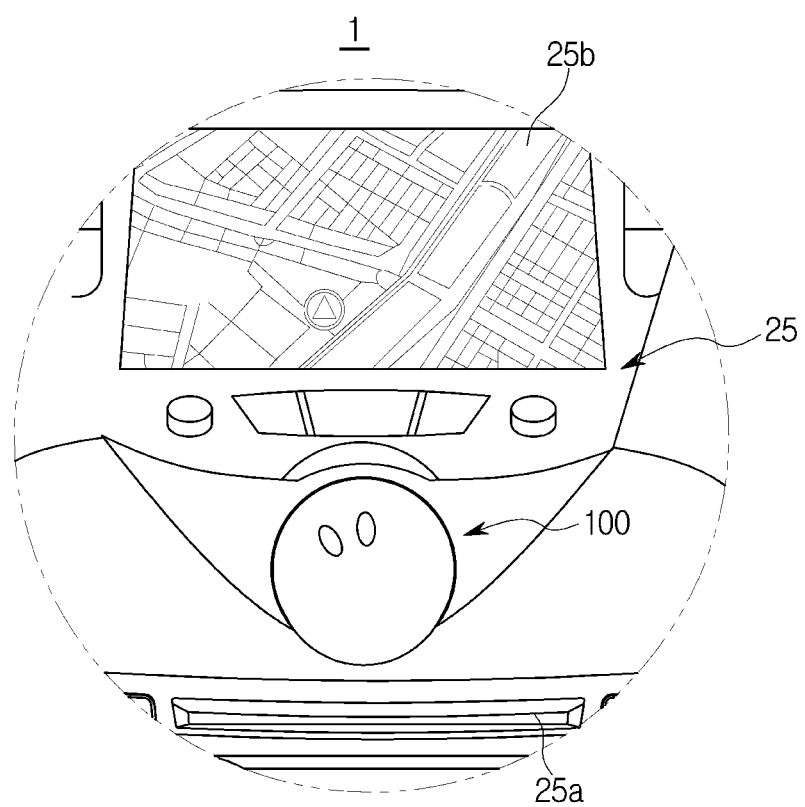
FIG. 9 is a perspective diagram illustrating a state in which a gesture recognition apparatus according to a first embodiment of the present invention is installed in a center fascia.

FIG. 8 is a perspective diagram illustrating a state in which the gesture recognition apparatus 100 according to a first embodiment of the present invention is installed in the gearbox 26, and FIG. 9 is a perspective diagram illustrating a state in which the gesture recognition apparatus 100 according to a first embodiment of the present invention is installed in the center fascia 25.

The gearbox 26 may be generally provided between a driver's seat and a front passenger's seat inside the vehicle 1, and in the gearbox 26, operating devices which are required to be operated while the driver drives the vehicle 1 may be mounted.

Referring to FIG. 8, in the gearbox 26, a shift lever 26a for transmission of the vehicle 1 and buttons 26b for executing various devices of the vehicle 1 may be provided. In the gearbox 26, the gesture recognition apparatus 100 according to a first embodiment of the present invention may be provided.

The gesture recognition apparatus 100 according to an embodiment of the present invention may be provided in the gearbox 26 so that a driver can comfortably operate the gesture recognition apparatus 100 while gazing at a front of the vehicle while driving. As an example, the gesture recognition apparatus 100 may be positioned in a lower portion of the shift lever 26a to input a gesture while a user's hand is seated on an arm rest 26c.

Meanwhile, unlike FIG. 8, the gesture recognition apparatus 100 may be positioned on a front side of the arm rest of the rear seat.

Referring to FIG. 9, in the center fascia 25, the audio device 25a, the navigation device 25b, and the like may be provided. The navigation device 25b may be embedded in the center fascia 25 of the vehicle 1 or formed to protrude on the dashboard. The gesture recognition apparatus 100 according to the first embodiment of the present invention may be provided.

The gesture recognition apparatus 100 according to an embodiment of the present invention may be positioned in a lower portion of the navigation device 25b to allow a driver to readily operate the navigation device 25b. That is, the driver may input a gesture in a position close to the navigation device 25b, thereby obtaining immediate feedback.

Meanwhile, the gesture recognition apparatus 100 may be connected to display devices inside the vehicle 1 to select or execute various icons displayed on the display devices. In the display device provided in the vehicle 1, the audio device 25a, the navigation device 25b, the cluster, and the like may be provided. In addition, the display device may be provided in the gearbox 26, as necessary. In addition, the display device may be connected to a head up display (HUD) device or back mirrors, and the like. As an example, the gesture recognition apparatus 100 may move a cursor displayed on the display device or execute an icon. The icon may include a main menu, a selection menu, a setting menu, and the like. In addition, through the gesture recognition apparatus 100, a traveling condition of the vehicle 1 may be set or peripheral devices of the vehicle 1 may be executed.

Figure 10:
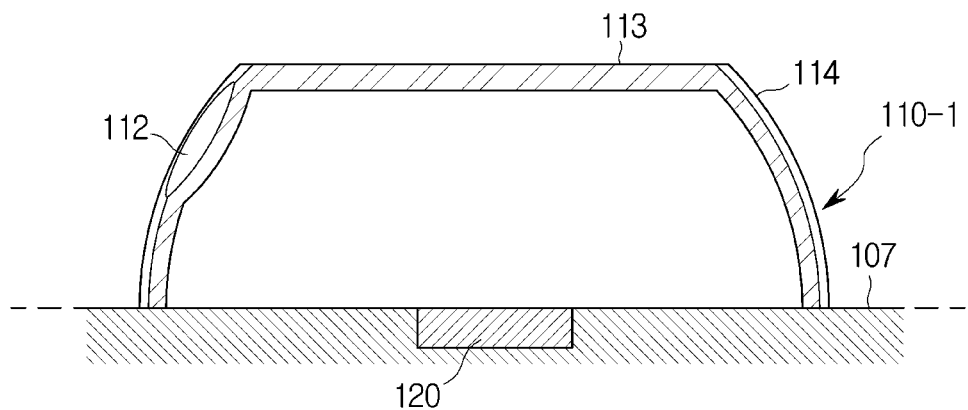
FIG. 10 is a cross-sectional diagram illustrating a structure of a gesture recognition apparatus according to a second embodiment of the present invention.
Figure 11:
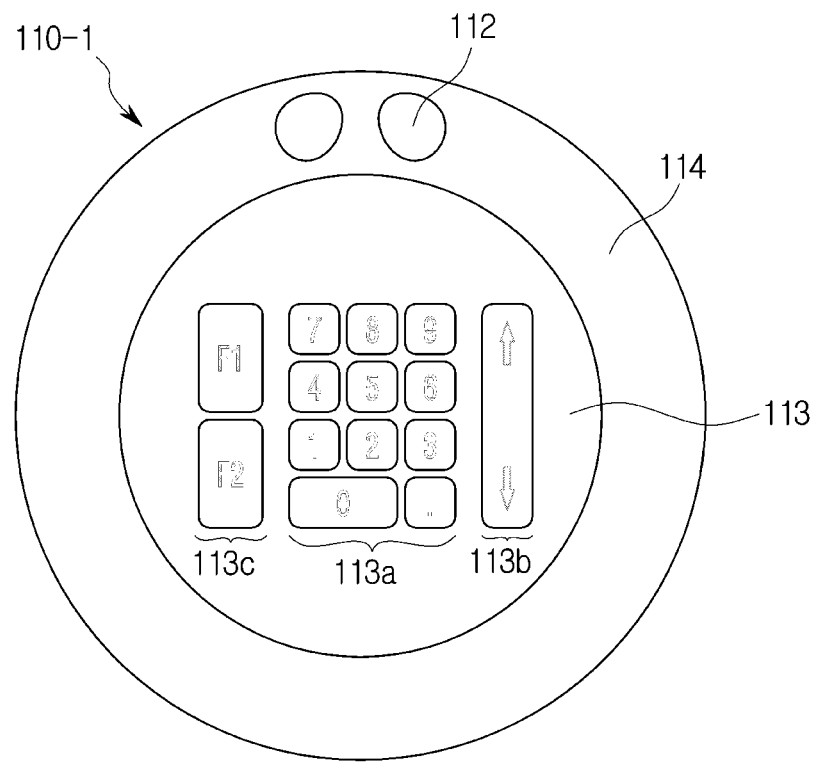
FIG. 11 is a plan diagram illustrating a touch region of a gesture recognition apparatus according to a second embodiment of the present invention.

Hereinafter, a gesture recognition apparatus 100-1 according to a second embodiment of the present invention will be described with reference to FIGS. 10 and 11. FIG. 10 is a cross-sectional diagram illustrating a structure of the gesture recognition apparatus 100-1 according to a second embodiment of the present invention, and FIG. 11 is a plan diagram illustrating a touch region of the gesture recognition apparatus 100-1 according to a second embodiment of the present invention.

Referring to FIG. 10, a cover 110-1 of the gesture recognition apparatus 100-1 according to the second embodiment of the present invention includes a planar contact surface 113 and a curved contact surface 114 that extends outside the planar contact surface 113. In this instance, the curved contact surface 114 may be a part of a spherical surface with respect to the gesture sensor 120.

Meanwhile, a tap portion 112 may be positioned on a front side of the curved contact surface 114.

The gesture recognition apparatus 100-1 according to the second embodiment of the present invention may include the planar contact surface 113, so that a user drawing a contact gesture may be more facilitated. When the user draws a gesture with a predetermined shape such as numbers or characters using his or her finger, drawing the corresponding gesture on a planar surface may be more facilitated rather than drawing the corresponding gesture on a curved surface.

Referring to FIG. 11, a variety of keypads may be provided on the planar contact surface 113 of the gesture recognition apparatus 100-1 according to the second embodiment of the present invention. As an example, the variety of keypads may include a numeric keypad 113a, a scroll keypad 113b, and a shortcut keypad 113c. The shortcut keypad 113c may be provided in such a manner that the function of the shortcut keypad 113c may be changed by setting.

The numeric keypad 113a and the shortcut keypad 113c may input a command through a contact gesture. That is, the corresponding function may be executed in such a manner that a user's finger or a pen is brought into contact with a position in which the numeric keypad 113a and the shortcut keypad 113c are provided by the user.

More specifically, the controller 103 may compare pre-stored positional information of the keypad and positional information of the finger, determine that the finger is brought into contact with the keypad when the two pieces of positional information are the same, and execute an operation command. That is, when it is assumed that the finger is brought into contact with a numerical number "1" of the keypad, the controller 103 determines that the positional information of the finger coincides with positional information of the numerical number "1" of the keypad based on input signals input from the gesture sensor 120, and transmits an operation command corresponding to the numerical number "1".

The scroll keypad 113b may input a command through a scroll gesture. That is, when moving the finger or pen while bringing the finger or pen into contact with a position in which the scroll keypad 113b is provided, a user may execute a scroll command.

Figure 12:
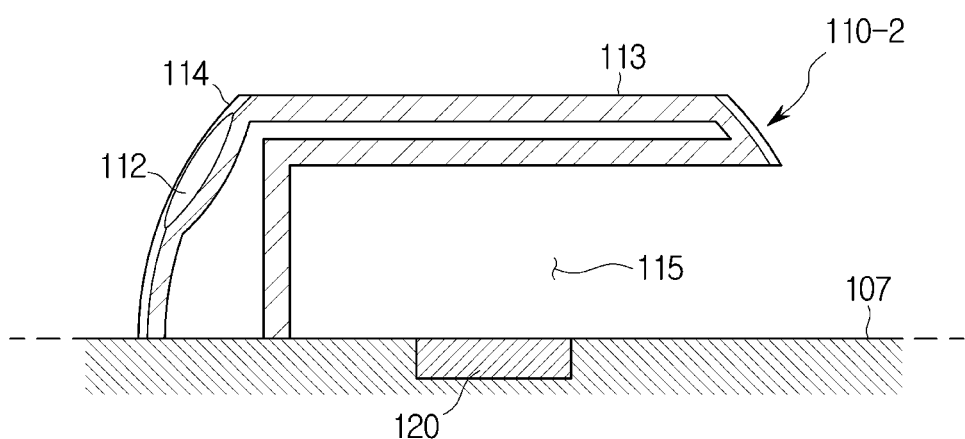
FIG. 12 is a cross-sectional diagram illustrating a structure of a gesture recognition apparatus according to a third embodiment of the present invention.

FIG. 12 is a cross-sectional diagram illustrating a structure of a gesture recognition apparatus according to a third embodiment of the present invention.

Referring to FIG. 12, one side of a cover 110-2 of a gesture recognition apparatus 100-2 according to a third embodiment of the present invention is opened to form a space 115 so that an object can be inserted through the opened side. The one side of the cover 110-2 is opened, and therefore the space 115 formed between the contact surfaces 113 and 114 and the gesture sensor 120 may be used as a space in which a gesture can be input.

The contact surfaces 113 and 114 may include the planar contact surface 113 and the curved contact surface 114.

Both side portions and a rear side of the cover 110-2 shown in FIG. 12 excluding a front side thereof are opened so that an object may be inserted through one side portion of the opened portion to pass through the other side portion thereof. However, unlike this, only the rear side may be opened so that the object is inserted through the opened rear side and then is escaped out through the opened rear side again.

The gesture recognition apparatus 100-2 according to the third embodiment of the present invention may spatially distinguish three gestures. That is, the controller 103 may recognize a gesture input from an upper portion of each of the contact surfaces 113 and 114 as a first space gesture, recognize a gesture input in a state of being brought into contact with the contact surfaces 113 and 114 as a contact gesture, and recognize a gesture input from a space input unit as a second space gesture.

In addition, the controller 103 may distinguish the first space gesture and the second space gesture to output mutually different operation signals. That is, when a user inputs a gesture by an operation of waving his or her hand, the controller 103 may distinguish a case of waving his or her hand in the upper portion of the contact surfaces 113 and 114 and a case of waving his or her hand in the space input unit to thereby output mutually different operation signals. Thus, operation signals which can be input by the gesture may be provided in various ways.

In addition, the controller 103 may operate mutually different devices by distinguishing the first space gesture and the second space gesture. As an example, the controller 103 may operate the navigation device using the first space gesture, and operate the air conditioning device using the second space gesture.

Figure 13:
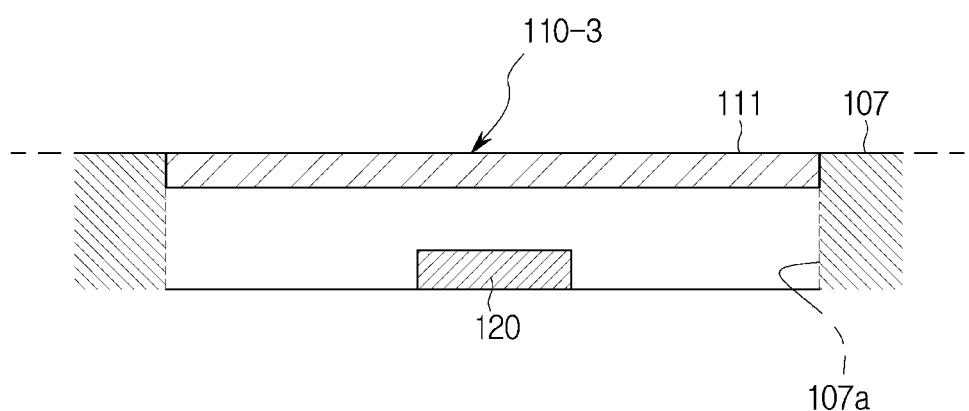
FIG. 13 is a cross-sectional diagram illustrating a structure of a gesture recognition apparatus according to a fourth embodiment of the present invention.

FIG. 13 is a cross-sectional diagram illustrating a structure of a gesture recognition apparatus 100-3 according to a fourth embodiment of the present invention.

The covers 110, 110-1, and 110-2 of the gesture recognition apparatuses 100, 100-1, and 100-2 according to the first to third embodiments of the present invention are provided to protrude from a peripheral mounting surface 107.

Unlike this, a contact surface 111 of a cover 110-3 of the gesture recognition apparatus 100-3 according to a fourth embodiment of the present invention is provided in the same position as an extension line of the mounting surface 107.

Referring to FIG. 13, the gesture sensor 120 is provided in a groove 107a recessed from the mounting surface 107. As described above, in order for the gesture sensor 120 to recognize the object, a predetermined distance between the gesture sensor 120 and the object is required. For this reason, a depth of the recessed groove 107a on which the gesture sensor 120 is provided should be longer than a minimum distance required for the gesture sensor 120 to recognize the object.

The contact surface 111 of the cover 110-3 may form the same plane as the mounting surface 107. Thus, it is possible to provide an aesthetic appearance because the cover 110-3 does not protrude from the periphery. In particular, when the gesture recognition apparatus 100-3 is provided in the vehicle 1, the cover 110-3 does not protrude from the peripheral mounting surface 107, thereby making the interior design of the vehicle 1 luxurious.

Hereinafter, a gesture recognition method according to an embodiment of the present invention will be described with reference to FIGS. 14 and 15.

Figure 14:
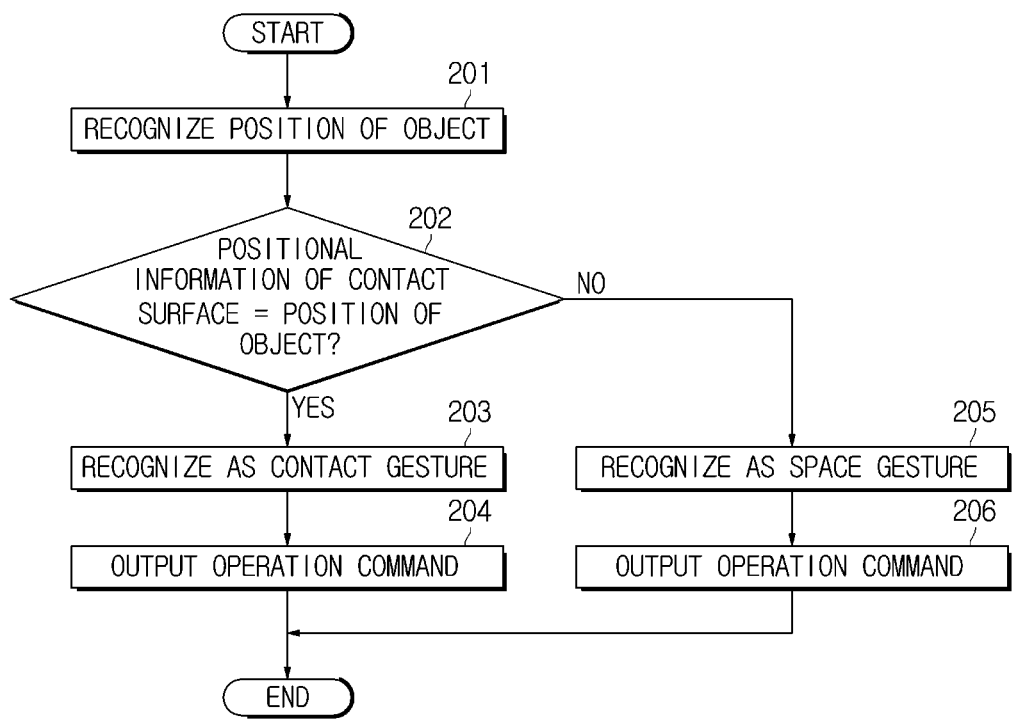
FIG. 14 is a flowchart illustrating a gesture recognition method according to one embodiment of the present invention.

FIG. 14 is a flowchart illustrating a gesture recognition method according to one embodiment of the present invention.

In operation 201, the gesture recognition method according to one embodiment of the present invention may recognize a shape and a position of an object moving in space based on signals detected by the gesture sensor 120. Whether the object is a gesture input means may be determined by recognizing the shape of the object. Meanwhile, the position of the object may be recognized based on shape information of the object. As an example, when the object is a user's finger, a position of a finger's distal portion of the user may be recognized.

Next, in operation 202, the gesture recognition method may compare positional information of the contact surface 111 and the position of the object. The positional information of the contact surface 111 may be prestored in the storage 104. Alternatively, a position of the contact surface 111 may be recognized together with recognition of the position of the object to be stored.

The contact surface 111 may refer to an outer surface of the cover, for example, the cover 110-3, positioned to be separated from the gesture sensor 120 by a predetermined distance, and a plurality of pieces of positional information of the contact surface 111 may be stored along the outer surface of the cover 110-3.

When positional information of the contact surface 111 and the position of the object are compared, whether the recognized position of the object is matched to any one of the plurality of pieces of positional information of the contact surface 111 may be determined. In this instance, to be matched may include belonging to a matching range as well as coinciding with each other. The matching range may consider a recognition error of the gesture sensor 120. Meanwhile, the recognized position of the object may be determined to be matched to the positional information of the contact surface 111 when the object approaches the contact surface 111 within a predetermined range in a case in which the matching range is largely set.

In operation 203, the gesture recognition method may recognize a contact of the object as the contact gesture when it is determined that the positional information of the contact surface 111 matched to the position of the object is present.

The gesture recognition method may output an operation command immediately after recognizing the contact as the contact gesture in operation 204, and wait for information about whether the object moves for a predetermined time. When detecting the movement of the object, the gesture recognition method may recognize a trajectory in which the object moves on the contact surface 111 by tracking the movement of the object.

Meanwhile, when the object is determined to be separated from the contact surface 111, the gesture recognition method may terminate the contact gesture. That is, when the positional information of the contact surface 111 matched to the position of the object is absent, the gesture recognition method may determine that the object is separated from the contact surface 111, thereby terminating the contact gesture.

Alternatively, when the object is separated from the contact surface 111, the gesture recognition method may stand by for a predetermined time without immediately terminating the contact gesture. When the object is determined to be brought into contact with the contact surface 111 again within a predetermined time, the gesture recognition method may recognize this as an extension of the previously input gesture.

As an example, at the time of movement from one stroke to the following stroke in a case of a gesture including a plurality of strokes, the object moves while being separated from the contact surface 111. Thus, when the object is separated from the contact surface 111, the gesture recognition method may wait for the following gesture without immediately terminating recognition of the contact gesture.

Next, in operation 205, when the positional information of the contact surface 111 matched to the recognized position of the object is determined to be absent, the gesture recognition method may recognize the shape or movement of the object as the space gesture.

When the shape of the object is recognized as the space gesture, the shape itself of the object may be recognized as the space gesture at a certain time. Alternatively, when the movement of the object is recognized as the space gesture, a movement route of the object or a transformation of the object may be recognized as the space gesture by tracking the object moving during a continuous time.

In operation 206, the gesture recognition method may output an operation command immediately after recognizing as the space gesture, and wait for information about whether the object moves for a predetermined time.

Figure 15:
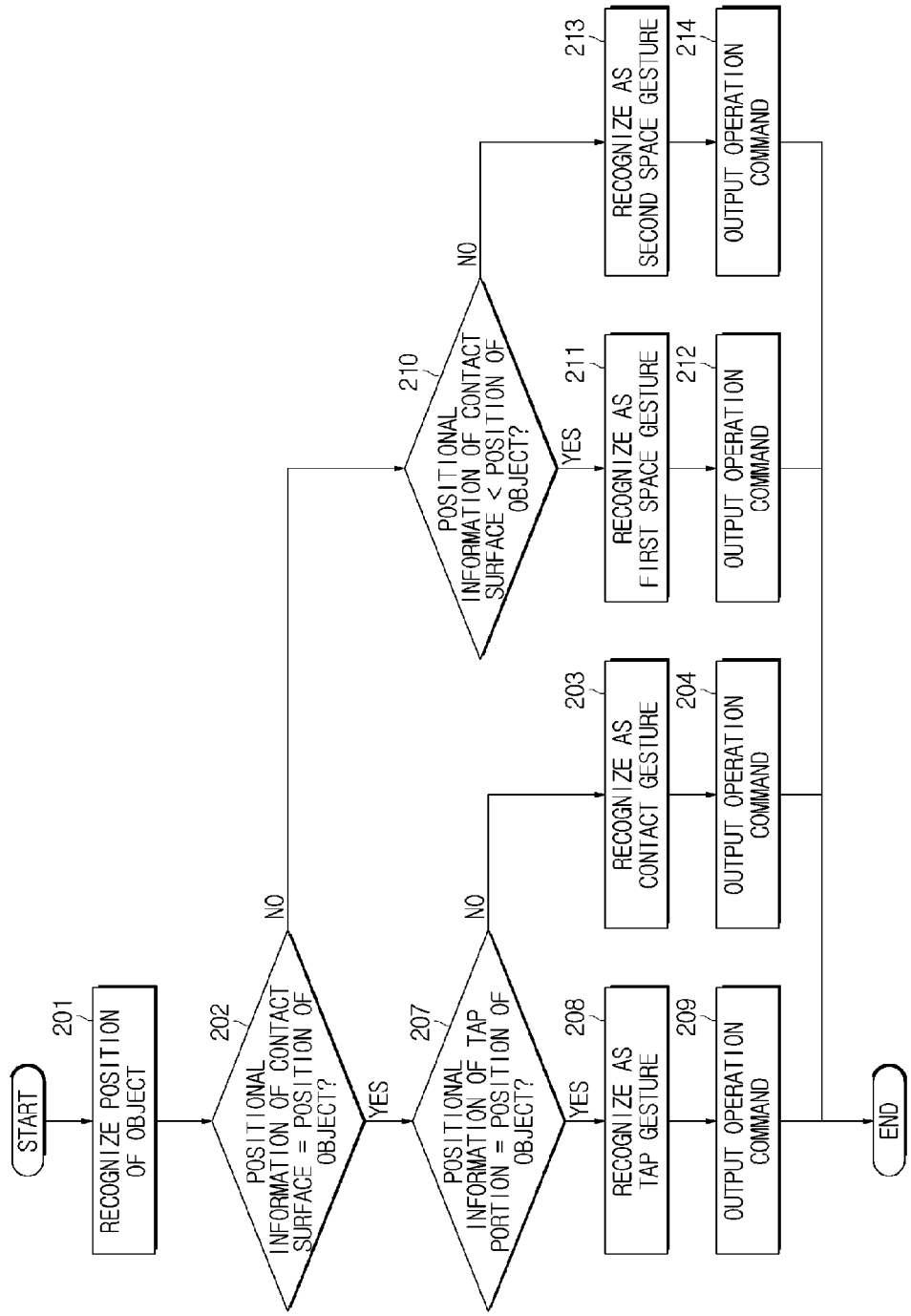
FIG. 15 is a flowchart illustrating a gesture recognition method according to another embodiment of the present invention.

FIG. 15 is a flowchart illustrating a gesture recognition method according to another embodiment of the present invention.

In operation 207, when the positional information of the contact surface 111 matched to the position of the object is determined to be present, the gesture recognition method according to the other embodiment of the present invention may determine again whether the positional information of the function unit matched to the position of the object is present.

The function unit may be provided as a region of the contact surface 111 designated in advance. Thus, in operation 208, when the positional information of the contact surface 111 is the positional information of the function unit even in a case in which the positional information of the contact surface 111 matched to the position of the object is determined to be present in operation 203, the gesture recognition method may determine this as a function gesture.

As examples of the function gesture, a tap gesture, a scroll gesture, a keypad gesture, a shortcut gesture, and the like may be given.

In operation 209, when the corresponding case is determined as the function gesture, the gesture recognition method may output an operation command so as to perform a function corresponding to the function gesture. As an example, when the corresponding case is determined as the tap gesture, the gesture recognition method may select a temporarily selected menu by movement of the cursor on the display unit.

Meanwhile, in operation 203, when the positional information of the function unit matched to the position of the object is absent, the gesture recognition method may determine this as a general contact gesture.

The gesture recognition method according to the other embodiment of the present invention may distinguish the first space gesture and the second space gesture. That is, a space gesture input outside the cover, for example, the cover 110-3, may be recognized as the first space gesture, and a space gesture input from a gesture input space 115 provided in a lower portion of the cover 110-3 may be recognized as the second space gesture.

In order to determine this, the gesture recognition method may compare the positional information of the contact surface 111 and the recognized position of the object in operation 210, recognize a case in which the object is determined to be outside the contact surface 111 as the first space gesture in operation 211, and recognize a case in which the object is determined to be inside the contact surface 111 as the second space gesture in operation 213. That is, the positional information of the contact surface 111 may act as a boundary for distinguishing the first space gesture and the second space gesture.

When the corresponding case is determined as the first space gesture, the gesture recognition method may output the corresponding operation command in operation 212, and when the corresponding case is determined as the second space gesture, the gesture recognition method may output the corresponding operation command in operation 214. Meanwhile, even when the first space gesture and the second space gesture have the same shape or trajectory, positions of the first space gesture and the second space gesture are different from each other, and therefore the gesture recognition method may output mutually different operation commands.

As is apparent from the above description, the gesture recognition apparatus, the vehicle including the gesture recognition apparatus, and the gesture recognition method according to the embodiments of the present invention may input a gesture in a state in which the contact unit is brought into contact with the object, and therefore input and termination time of the gesture, and a route of the gesture may be accurately recognized, thereby improving the accuracy of operation.

In addition, the corresponding case may be recognized as the contact gesture only in a state in which the contact unit is brought into contact with the object, and therefore, when a gesture including a plurality of strokes is input, a moving operation between the strokes may not be recognized as a gesture, whereby the gesture may be input as intended by a user. As a result, a more precise and broader gesture may be used.

In addition, a user may input a gesture on the contact surface, so that feedback for the shape of the gesture input by the user may be immediately provided, thereby more improving a feeling of operation and enabling an accurate input of the gesture.

In addition, the contact gesture input in a state in which the object is brought into contact with the contact surface and the space gesture input in space may be distinguished and input, thereby increasing the number of executable commands. In addition, when inputting in space is facilitated, the space gesture may be used, and when drawing on the contact surface is accurate, the contact gesture may be used, thereby improving efficiency and accuracy of gesture recognition.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A gesture recognition apparatus comprising:
    a gesture sensor detecting a position and movement of an object;
    a cover including a contact surface which is positioned away from the gesture sensor by a predetermined distance;
    a storage containing position information of the contact surface; and
    a controller that outputs operation signals by analyzing a gesture through signals input from the gesture sensor,
    wherein the controller recognizes at least one of a position, a shape, and a movement trajectory of the object in a state in which the object is separated from the contact surface, as a space gesture, and
    wherein the space gesture in which the object is determined to be outside the contact surface is recognized as a first space gesture, and the space gesture in which the object is determined to be inside the contact surface is recognized as a second space gesture.

2. The gesture recognition apparatus according to claim 1, wherein the cover includes a semi-spherical shape or a partial shape of a semi-sphere with respect to the gesture sensor.

3. The gesture recognition apparatus according to claim 1, wherein a distance between the gesture sensor and each point on the contact surface is constant.

4. The gesture recognition apparatus according to claim 1, wherein the cover includes a tap portion that is formed to be recessed so that a finger's distal portion of a user is seated on the tap portion.

5. The gesture recognition apparatus according to claim 1, wherein the controller recognizes at least one of a position, a shape, and a movement trajectory of the object in a state in which the object is brought into contact with the contact surface, as a contact gesture.

6. A gesture recognition apparatus comprising:
    a gesture recognition unit that detects a position and movement of an object in space;
    a contact unit that is positioned to be spaced apart from the gesture recognition unit; and
    a controller that receives signals of the gesture recognition unit to analyze a gesture and output operation signals,
    wherein the controller recognizes at least one of a position, a shape, and a movement trajectory of the object in a state in which the object is brought into contact with the contact unit, as a contact gesture,
    wherein the controller recognizes at least one of a position, a shape, and a movement trajectory of the object in a state in which the object is separated from the contact unit, as a space gesture, and
    wherein the space gesture in which the object is determined to be outside the contact unit is recognized as a first space gesture, and the space gesture in which the object is determined to be inside the contact unit is recognized as a second space gesture.

7. The gesture recognition apparatus according to claim 6, wherein the contact unit includes a tap portion, and the controller receives an operation in which the object is brought into contact with the tap portion, as a tap gesture.

8. The gesture recognition apparatus according to claim 6, wherein the contact unit includes a scroll portion, and the controller receives a trajectory in which the object moves while being in contact with the scroll portion, as a scroll gesture.

9. The gesture recognition apparatus according to claim 6, wherein the controller starts contact gesture recognition when the object is recognized to be positioned on a contact surface of the contact unit stored in advance.

10. The gesture recognition apparatus according to claim 7, wherein the controller recognizes, as a tap gesture, a case in which the object is recognized to be positioned on a contact surface of the tap portion stored in advance, and starts contact gesture recognition when the object is recognized to be positioned on a contact surface of the contact unit excluding the tap portion stored in advance.

11. The gesture recognition apparatus according to claim 9, wherein the controller terminates the contact gesture recognition when the object is recognized to be separated from the contact surface of the contact unit stored in advance.

12. The gesture recognition apparatus according to claim 11, wherein the controller recognizes, as a continuous contact gesture, a case in which the object is recognized to be separated from the contact surface of the contact unit stored in advance and then recognized again to be positioned on the contact surface of the contact unit stored in advance within a predetermined time.

13. A vehicle comprising:
a mounting surface provided inside the vehicle;
a gesture recognition unit provided on the mounting surface to detect a position and movement of an object in space inside the vehicle;
a contact unit positioned to be spaced apart from the gesture recognition unit; and
a controller receiving signals of the gesture recognition unit to analyze a gesture and output operation signals,
wherein the controller recognizes at least one of a position, a shape, and a movement trajectory of the object in a state in which the object is brought into contact with the contact unit, as a contact gesture, and recognizes at least one of a position, a shape, and a movement trajectory of the object in a state in which the object is separated from the contact surface, as a space gesture, and
wherein the space gesture in which the object is determined to be outside the contact unit is recognized as a first space gesture, and the space gesture in which the object is determined to be inside the contact unit is recognized as a second space gesture.

* * * * *